United States Patent
Morishita

(10) Patent No.: US 7,688,356 B2
(45) Date of Patent: Mar. 30, 2010

(54) CLAMP LEVEL ADJUSTING APPARATUS, ELECTRONIC CAMERA, IMAGE PROCESSING APPARATUS, AND IMAGE PROCESSING PROGRAM

(75) Inventor: Akihiko Morishita, Hiratsuka (JP)

(73) Assignee: Nikon Corporation, Tokyo (JP)

( * ) Notice: Subject to any disclaimer, the term of this patent is extended or adjusted under 35 U.S.C. 154(b) by 1336 days.

(21) Appl. No.: 11/100,385

(22) Filed: Apr. 7, 2005

(65) Prior Publication Data

US 2005/0248665 A1 Nov. 10, 2005

(30) Foreign Application Priority Data

May 7, 2004 (JP) .............................. 2004-138375
Jun. 25, 2004 (JP) .............................. 2004-187768

(51) Int. Cl.
*H04N 5/228* (2006.01)
*H04N 5/217* (2006.01)
*H04N 9/64* (2006.01)

(52) U.S. Cl. ...................... 348/222.1; 348/241; 348/243

(58) Field of Classification Search ............... 348/222.1, 348/228, 241, 448, 243, 250
See application file for complete search history.

(56) References Cited

U.S. PATENT DOCUMENTS

| | | | |
|---|---|---|---|
| 5,105,276 A | | 4/1992 | Schrock |
| 6,002,445 A * | 12/1999 | Urayama .................... 348/572 |
| 6,084,634 A * | 7/2000 | Inagaki et al. ............... 348/294 |
| 6,172,716 B1 | 1/2001 | Karlock |
| 6,304,292 B1 * | 10/2001 | Ide et al. ..................... 348/243 |
| 6,463,214 B1 | 10/2002 | Nakata |
| 6,580,465 B1 * | 6/2003 | Sato ........................... 348/689 |
| 6,597,395 B1 * | 7/2003 | Kim et al. ................ 348/222.1 |
| 6,700,609 B1 * | 3/2004 | Abe ............................ 348/243 |
| 6,720,999 B1 * | 4/2004 | Holberg et al. ........... 348/222.1 |
| 6,774,941 B1 * | 8/2004 | Boisvert et al. ............. 348/241 |
| 6,774,942 B1 * | 8/2004 | Salcedo et al. .............. 348/243 |
| 6,791,607 B1 * | 9/2004 | Bilhan et al. ................ 348/243 |
| 7,432,965 B2 * | 10/2008 | Mori .......................... 348/243 |
| 2002/0021897 A1 | 2/2002 | Nakata |
| 2003/0071908 A1 | 4/2003 | Sannoh et al. |
| 2004/0008270 A1 | 1/2004 | Hisamatsu et al. |
| 2004/0090558 A1 * | 5/2004 | Takahashi et al. ........... 348/691 |
| 2004/0189839 A1 * | 9/2004 | McDermott ................. 348/243 |
| 2004/0252204 A1 * | 12/2004 | Kurane .................... 348/222.1 |

(Continued)

FOREIGN PATENT DOCUMENTS

EP 0 784 397 A2 7/1997

(Continued)

*Primary Examiner*—Lin Ye
*Assistant Examiner*—Amy Hsu
(74) *Attorney, Agent, or Firm*—Oliff & Berridge, PLC

(57) ABSTRACT

A clamp level adjusting apparatus of the invention includes: an image pickup device which has an effective pixel area for producing an image signal and a lightproof area formed around the effective pixel area to produce a black level standard signal; a clamp level calculating section for extracting the black level standard signal from an extracting range of a plurality of horizontal rows in the lightproof area and for producing a clamp level value corresponding to each horizontal row in the effective pixel area based on a vertical moving average value of black level standard signals in the extracting range; and a clamp section for correcting a black level of the image signal based on the clamp level value.

8 Claims, 11 Drawing Sheets

U.S. PATENT DOCUMENTS

| | | |
|---|---|---|
| 2007/0263909 A1 | 11/2007 | Ojima et al. |
| 2007/0263933 A1 | 11/2007 | Ojima et al. |
| 2007/0263934 A1 | 11/2007 | Ojima et al. |
| 2007/0263935 A1 | 11/2007 | Sanno et al. |
| 2007/0268370 A1 | 11/2007 | Sanno et al. |

FOREIGN PATENT DOCUMENTS

| | | |
|---|---|---|
| JP | A 2000-066312 | 3/2000 |
| JP | A-2002-281343 | 9/2002 |
| JP | A 2003-209713 | 7/2003 |
| JP | A-2003-244556 | 8/2003 |
| JP | 2004-088406 | 3/2004 |
| WO | WO 94/07334 | 3/1994 |

\* cited by examiner

CLAMP LEVEL ADJUSTING APPARATUS, ELECTRONIC CAMERA, IMAGE PROCESSING APPARATUS, AND IMAGE PROCESSING PROGRAM

CROSS-REFERENCE TO RELATED APPLICATIONS

This application is based upon and claims the benefit of priorities from Japanese Patent Application Nos. 2004-138375 and 2004-187768, each filed on May 7, 2004 and Jun. 25, 2004, the entire contents of which are incorporated herein by reference.

BACKGROUND OF THE INVENTION

1. Field of the Invention

The present invention relates to a clamp level adjusting circuit for making a black level correction to an output from an image pickup device in an electronic camera or the like. The invention also relates to an image processing apparatus and an image processing program for processing photographic images captured by an electronic camera.

2. Description of the Related Art

It is conventionally known that outputs from an image pickup device of an electronic camera contain black level noise which results from dark current components in the light-receiving elements. There is a method for correcting such black levels which is well known to those skilled in the art. The method includes the steps of detecting the black level of a lightproof area or part of the image pickup device shielded against ambient light and then subtracting the black level from the image level of an unshielded effective pixel area.

Disclosed in Japanese Unexamined Patent Application Publication No. 2003-209713 is a black level correction apparatus for comparing the average value of horizontal rows of digital signals in the lightproof area with a black level target value to calculate a correction value and then providing feedback of the digital-to-analog converted correction value for a black level correction.

Suppose that there is a plurality of defective pixels in a particular horizontal row in a lightproof area. In this case, the apparatus disclosed in Japanese Unexamined Patent Application Publication No. 2003-209713 mentioned above could be improved in that a significant variation in black level average value from a proper value would cause the black level correction to be locally reduced in accuracy.

Furthermore, according to Japanese Unexamined Patent Application Publication No. 2003-209713 mentioned above, no information on the black level correction exists in the image data that has been corrected. It is thus very difficult to determine based on the image data as to how the black level correction was made. Particularly when the corrected image data is processed to adjust the brightness of the image, the information on the black level correction would serve as a reference on which the brightness of the image could rely when adjusted and thus provide a clear range of allowable correction. However, according to Japanese Unexamined Patent Application Publication No. 2003-209713 mentioned above, no information on the black level correction was not included in the image data. Accordingly, the user had to make black level re-corrections repeatedly by trial and error. With this being the case, conventional computer image processing did not sufficiently meet user requirements for subtle brightness adjustment of image data.

On the other hand, recent years have seen increasingly widespread use of electronic cameras which include an image pickup device for photoelectric conversion of subject images to create photographic image digital data (photographic image data). It has also been commonly practiced to adjust various parameters of photographic image data on a computer to create images as desired by users.

In this context, an image playback apparatus disclosed in Japanese Unexamined Patent Application Publication No. 2000-66312 can be used for playback of digital images on a computer. To this end, the apparatus is adapted to associate supplementary information on shooting circumstances, such as dates and places of shooting, with the photographic image data for transmission to the computer.

In general, outputs from an image pickup device of an electronic camera contain black level noise caused by dark current components. The electronic camera is thus adapted to detect the black level with part of the image pickup device being shielded against ambient light in order to make a black level correction by subtracting the detected black level from the image level. Accordingly, when photographic image data is processed on a computer to adjust the brightness of the image, the information on the black level correction made by the electronic camera would serve as a reference on which the brightness of the image could rely when adjusted and thus provide a clear range of allowable correction.

However, conventionally, no information on the black level correction was left in photographic image data that was created by the electronic camera. Accordingly, when the user desired to process images on a computer, it was very difficult to determine based on the image data as to how the black level correction was made. According to Japanese Unexamined Patent Application Publication No. 2000-66312 described above, no information indicative of the contents of image processing performed by the electronic camera was contained in the supplementary information. Accordingly, the user had to adjust the brightness of images on a computer repeatedly by trial and error. With this being the case, conventional techniques did not sufficiently meet user requirements for subtle brightness adjustment of image data on a computer.

SUMMARY OF THE INVENTION

The present invention was developed to address the aforementioned conventional problems. It is therefore an object of the present invention to provide a clamp level adjusting apparatus which enables black level corrections with high accuracy.

It is another object of the invention to provide a clamp level adjusting apparatus which allows the user to obtain information on black level corrections and which provides enhanced convenience for image processing.

It is still another object of the invention to provide an image processing apparatus which allows the user to adjust the brightness of the screen based on the information of black level corrections made by an electronic camera in the reactive image processing using a computer or the like.

A clamp level adjusting apparatus according to a first aspect of the present invention includes an image pickup device, a clamp level calculating section, and a clamp section.

The image pickup device includes an effective pixel area for producing an image signal and a lightproof area formed around the effective pixel area to produce a black level standard signal. The clamp level calculating section extracts the black level standard signal from an extracting range of a plurality of horizontal rows in the lightproof area and produces a clamp level value corresponding to each horizontal row in the effective pixel area based on a vertical moving average value of black level standard signals in the extracting range. The clamp section corrects a black level of the image signal in accordance with the clamp level value.

In the clamp level adjusting apparatus according to the first aspect, the clamp level calculating section is preferable to include a low-pass filter, an integrating section, and a dividing section. The low-pass filter reduces a high-frequency component of the black level standard signal for each horizontal row in the lightproof area. The integrating section adds an output value from the low-pass filter up to the number of rows of the extracting range to output an integrated value of the extracting range. When an output value from the low-pass filter is supplied exceeding the number of rows of the extracting range, the integrated value is sequentially updated for output by subtracting the output value of the top row in the extracting range therefrom. The dividing section divides the integrated value by a predetermined value to produce the vertical moving average value.

The integrating section is preferable to also include an adding section, a register section, and a subtracting section. The adding section adds an output value from the low-pass filter at least up to the number of rows in the extracting range for output. The register section stores an output value from the low-pass filter up to the number of rows in the extracting range on a first-in first-out basis for sequential output. The subtracting section subtracts an output value of the register section from an output value of the adding section to calculate the integrated value and outputs the integrated value to a dividing section. The integrated value is supplied back to the adding section so that the integrated value is sequentially outputted to be a vertical moving sum of the extracting range.

Furthermore, in the clamp level adjusting apparatus according to the first aspect, the clamp level calculating section is preferable to produce a clamp level value corresponding to the uppermost horizontal row of the effective pixel area from the extracting range defined in the lightproof area above the uppermost row.

The clamp level adjusting apparatus according to the first aspect is preferable to further include a fixed value storing section and a selecting section. The fixed value storing section stores a fixed value of clamp level which has been pre-set to correct a black level of the image signal. The selecting section selects either one of the fixed value of clamp level and the vertical moving average value based on a user input to output the clamp level value.

A clamp level adjusting apparatus according to a second aspect of the present invention includes an image pickup device, a clamp level calculating section, a clamp section, and an output section.

The image pickup device includes an effective pixel area for producing an image signal and a lightproof area formed around the effective pixel area to produce a black level standard signal. The clamp level calculating section produces a clamp level value corresponding to each horizontal row in the effective pixel area based on the black level standard signal or a pre-set fixed value of clamp level. The clamp section corrects a black level of the image signal in accordance with the clamp level value. The output section provides output by associating black level corrected image data outputted from the clamp section with the clamp level value outputted from the clamp level calculating section for each horizontal row in the effective pixel area.

The clamp level adjusting apparatus according to the first and second aspects can be used for electronic cameras.

An image processing apparatus according to a third aspect of the invention processes a photographic image provided by an electronic camera which has an image pickup device including an effective pixel area and a lightproof area formed around the effective pixel area.

This image processing apparatus has a reading section, a display section, an input section, and a correction processing section. The reading section reads photographic image data. The photographic image data according to the third aspect includes image data created in accordance with an output from the effective pixel area and black level standard data created in accordance with an output from the lightproof area. The display section displays a relation between the black level standard data and the image data. The input section is used for changing the black level standard data. The correction processing section corrects a black level of the image data in accordance with the black level standard data changed at the input section.

In the image processing apparatus according to the third aspect, the display section is preferable to display a current value and an alterable range of the black level standard data, and a playback image based on the image data.

Furthermore, in the image processing apparatus according to the third aspect, the black level standard data is preferable to include a plurality of values each associated with data units for processing, which are obtained by vertically or horizontally dividing the image data. Additionally, when changing black level standard data at a specified place selected arbitrarily from a data unit for processing, it is preferable for the correction processing section to change black level standard data in the data unit for processing, which is vertically or horizontally adjacent to the specified place, in synchronization with a change in black level standard data at the specified place, and then interpolates changes in black level standard data within a predetermined range from the specified place, so that the changes appear smoothly.

An image processing apparatus according to a fourth aspect processes a photographic image provided by an electronic camera which has an image pickup device including an effective pixel area and a lightproof area formed around the effective pixel area.

This image processing apparatus includes a reading section, a singular point determination section, and a correction processing section. The reading section reads photographic image data. The photographic image data according to the fourth aspect includes image data created in accordance with an output from the effective pixel area and divided horizontally or vertically into a plurality of data units for processing, and also includes multiple pieces of black level standard data created in accordance with an output from the lightproof area and each associated with the data units for processing. The singular point determination section detects a singular point, at which a spatial variation is greater than or equal to a threshold value, in accordance with the spatial variation in the black level standard data. The correction processing section corrects the black level standard data corresponding to the singular point in accordance with the spatial variation.

An image processing apparatus according to a fifth aspect processes a photographic image provided by an electronic camera which has an image pickup device including an effective pixel area and a lightproof area formed around the effective pixel area.

This image processing apparatus includes a reading section, a correction coefficient producing section, and a correction processing section. The reading section reads photographic image data. The photographic image data according to the fifth aspect includes image data created in accordance with an output from the effective pixel area and divided horizontally or vertically into a plurality of data units for processing, and also includes multiple pieces of black level standard data created in accordance with an output from the lightproof area and each associated with the data units for processing. The correction coefficient producing section produces a horizontal or vertical shading correction coefficient in accordance with a spatial variation in the black level standard data. The correction processing section makes a shading correction to the image data using the correction coefficient.

In the third to fifth aspects, it is preferable for the electronic camera for producing photographic image data further includes a clamp section for making a black level correction to the image data, and the black level standard data has been used for a black level correction at the clamp section.

The image processing apparatus according to the third to fifth aspects is preferable to further include a recording section for storing a relation between a shooting condition of the electronic camera and an offset value of the black level standard data based on the shooting condition. Additionally, the correction processing section is preferable to acquire the offset value corresponding to the shooting condition from the recording section in accordance with the shooting condition of the electronic camera and then corrects a black level of the image data in accordance with the offset value.

According to a sixth aspect of the invention, provided is an image processing program for processing a photographic image provided by an electronic camera which has an image pickup device including an effective pixel area and a lightproof area formed around the effective pixel area. This image processing program allows a computer to execute the following steps:

a step of reading photographic image data including image data created in accordance with an output from the effective pixel area and black level standard data created in accordance with an output from the lightproof area;

a step of displaying a relation between the black level standard data and the image data; and a step of correcting a black level of the image data in accordance with the black level standard data changed by an operator input.

According to a seventh aspect of the invention, provided is an image processing program for processing a photographic image provided by an electronic camera which has an image pickup device including an effective pixel area and a lightproof area formed around the effective pixel area. This image processing program allows a computer to execute the following steps:

a step of reading photographic image data which includes image data created in accordance with an output from the effective pixel area and divided horizontally or vertically into a plurality of data units for processing, and which also includes multiple pieces of black level standard data created in accordance with an output from the lightproof area and each associated with the data units for processing;

a step of detecting a singular point, at which a spatial variation is greater than or equal to a threshold value, in accordance with the spatial variation in the black level standard data; and a step of correcting the black level standard data corresponding to the singular point in accordance with the spatial variation.

According to an eighth aspect of the invention, provided is an image processing program for processing a photographic image provided by an electronic camera which has an image pickup device including an effective pixel area and a lightproof area formed around the effective pixel area. This image processing program allows a computer to execute the following steps:

a step of reading photographic image data which includes image data created in accordance with an output from the effective pixel area and divided horizontally or vertically into a plurality of data units for processing, and which also includes multiple pieces of black level standard data created in accordance with an output from the lightproof area and each associated with the data units for processing;

a step of producing a horizontal or vertical shading correction coefficient in accordance with a spatial variation in the black level standard data; and a step of making a shading correction to the image data using the correction coefficient.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Now, the present invention will be described below in more detail with reference to the accompanying drawings in accordance with the embodiments.

Explanation of the Configuration of First Embodiment

Figure 1:
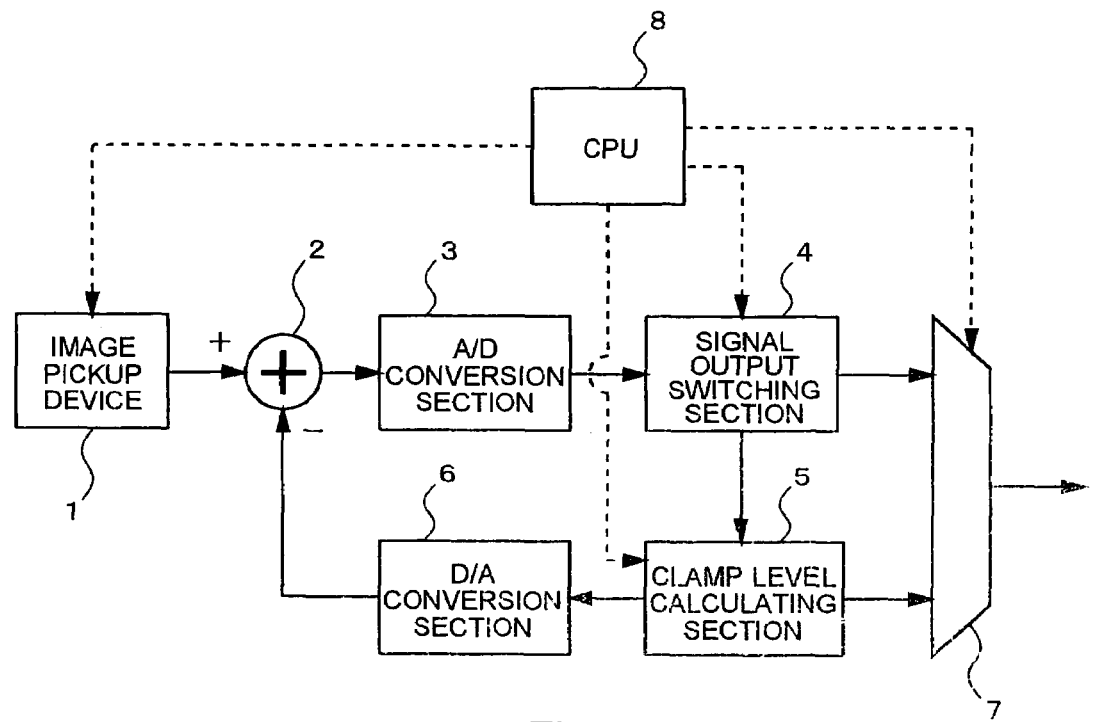
FIG. 1 is a block diagram showing a clamp level adjusting apparatus according to a first embodiment.

FIG. 1 is a block diagram showing a clamp level adjusting apparatus according to a first embodiment. The clamp level adjusting apparatus of the first embodiment is incorporated into an electronic camera, including an image pickup device 1, a clamp section 2, an A/D conversion section 3, a signal output switching section 4, a clamp level calculating section 5, a D/A conversion section 6, a first selector section 7 serving as an output section, and a CPU 8.

Figure 2:
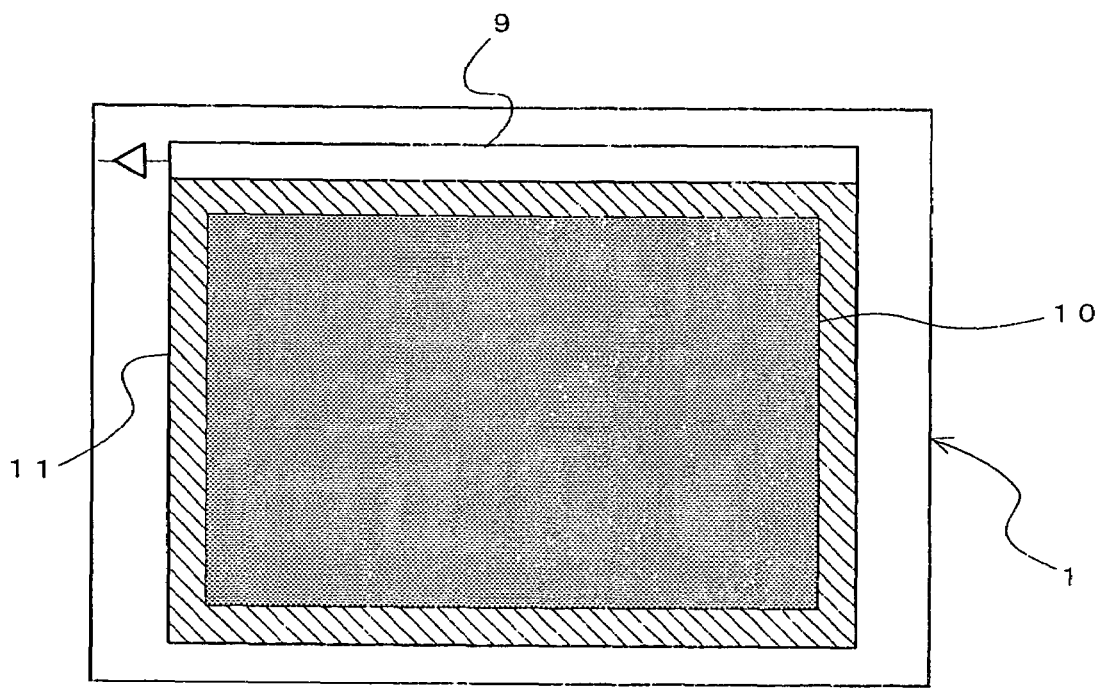
FIG. 2 is a view showing the configuration of a light-receiving face of an image pickup device.

As shown in FIG. 2, a light-receiving face of the image pickup device 1 has light-receiving elements (photodiodes) arranged in rows and columns for photoelectric conversion, each light-receiving element forming one pixel. There is also provided a vertical readout line (not shown) in each column of light-receiving elements. These vertical readout lines have a horizontal readout line 9 placed at their output ends, and the output from the horizontal readout line is connected to the clamp section 2.

As shown in FIG. 2, an area of the image pickup device 1 provided with the light-receiving elements is divided into an effective pixel area 10 and a lightproof area (optically black area) 11 formed adjacent to the outer periphery of the effective pixel area 10. The effective pixel area 10 accumulates signal charge in each light-receiving element depending on the brightness of a subject image formed by a photographic optical assembly (not shown). An image signal for creating a photographic image is produced in accordance with this signal charge.

On the other hand, the surface of the lightproof area 11 is shielded against ambient light using a shield film. Outputs from the lightproof area 11 can be considered to be data corresponding to a portion into which no subject light is incident, i.e., the black color of the subject image. In the lightproof area 11, charge (dark current component) that is caused by variations in temperature or the like and accumulated in the light-receiving elements is detected. In accordance with the charge, a black level standard signal is produced.

Figure 5:
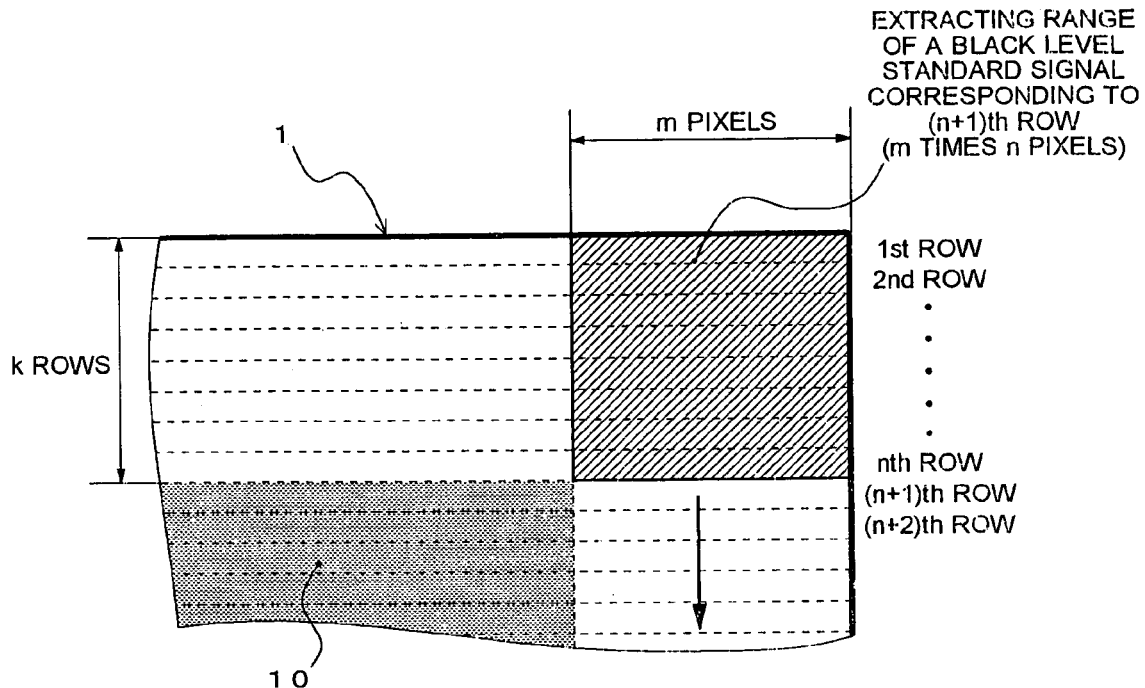
FIG. 5 is a view showing the relation between the rows in an effective pixel area and the extracting range.

Signals from the image pickup device 1 are read as follows. First, signals in the uppermost row of the image pickup device 1 are sequentially read from the left to the right end. Then, signals in the next lower row are read sequentially from the left to the right end. Subsequently, the same steps are repeated in this manner to read a screenful of signals sequentially by scanning. As shown in FIGS. 2 and 5, on the upper side of the effective pixel area 10 in the image pickup device 1, there are formed k rows of only the lightproof area 11 (with k≧2). Therefore, the image pickup device 1 continues to output k rows of only the black level standard signal until the image pickup device 1 outputs a signal from a row of the effective pixel area 10.

The clamp section 2 subtracts a clamp level value, discussed later, from the image signal and the black level standard signal of the image pickup device 1 to make a black level correction to the output from the image pickup device 1. The A/D conversion section 3 converts analog to digital the output from the clamp section 2 to digitize the image signal and the black level standard signal.

The signal output switching section 4 is connected to the clamp level calculating section 5 and the first selector section 7. The signal output switching section 4 switches the destination of the digital signal received from the A/D conversion section 3 based on an instruction from the CPU 8 to extract the black level standard signal of a predetermined portion (a horizontal row of m pixels) in the lightproof area 11.

The clamp level calculating section 5 calculates a vertical moving average value in an extracting range (m times n pixels) which includes n rows (n=>2 and n<=k) of the aforementioned m pixels of black level standard signals. The clamp level calculating section 5 outputs a total number of vertical moving average values that corresponds to the number of horizontal rows of the effective pixel area 10.

Figure 3:
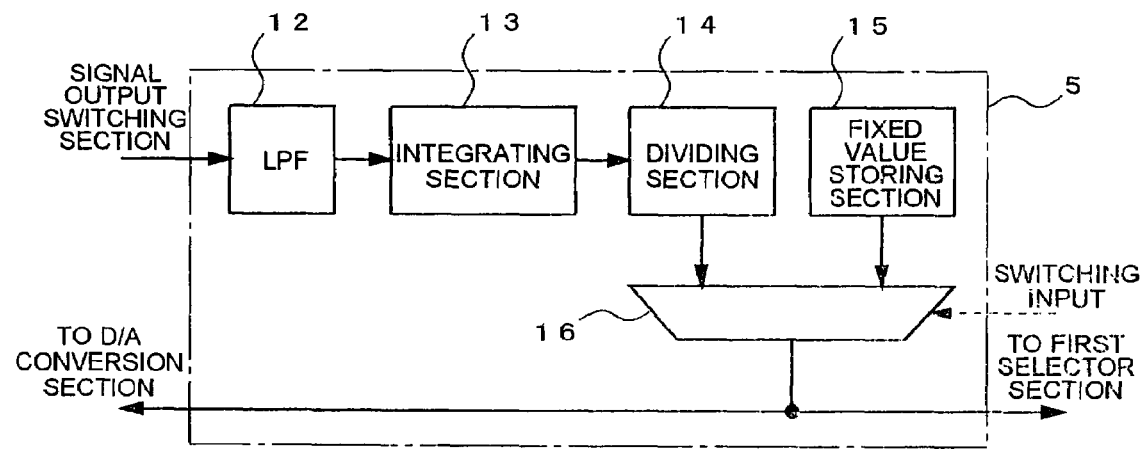
FIG. 3 is a block diagram showing a clamp level calculating section of FIG. 1.

As shown in FIG. 3, the clamp level calculating section 5 includes a LPF (Low Pass Filter) 12, an integrating section 13, a dividing section 14, a fixed value storing section 15, and a second selector section 16 serving as a selecting section.

The LPF 12 calculates an average value of m pixels of black level standard signals for each horizontal row to reduce high-frequency components of the black level standard signals caused by outputs from defective pixels or the like. The LPF 12 may also calculate a weighted average value of black level standard signals for each horizontal row or alternatively a sum of m pixels of black level standard signals for each horizontal row.

Figure 4:
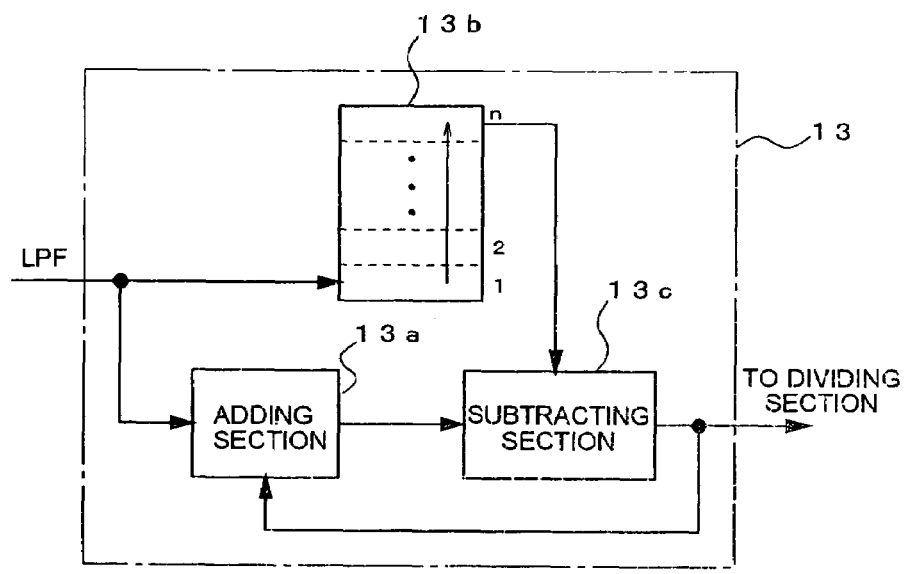
FIG. 4 is a block diagram showing an integrating section of FIG. 3.

The integrating section 13 calculates a vertical moving sum value (an integrated value) in the extracting range based on an output value of each horizontal row in the LPF 12. As shown in FIG. 4, the integrating section 13 includes an adding section 13a, a register section 13b, and a subtracting section 13c. An output from the LPF 12 is supplied individually to the adding section 13a and the register section 13b, and outputs from the adding section 13a and the register section 13b are supplied to the subtracting section 13c. An output from the subtracting section 13c is sequentially supplied to the dividing section 14 on one hand and also supplied back to the adding section 13a on the other hand.

The adding section 13a adds at least up to n rows of output values from the LPF 12 in accordance with an instruction from the CPU 8 for delivery to the subtracting section 13c. When supplied with an output back from the subtracting section 13c, the adding section 13a adds an output value from the LPF 12 to the input value supplied back from the subtracting section 13c for delivery to the subtracting section 13c.

The register section 13b stores up to n rows of output values from the LPF 12 in a first-in first-out data structure. The register section 13b sequentially delivers those output values over n rows of output values from the LPF 12 to the subtracting section 13c. Here, the register section 13b has initial default values of zeros.

The subtracting section 13c subtracts the output value of the register section 13b from the output value of the adding section 13a for calculating an integrated value.

The dividing section 14 divides the integrated value received from the subtracting section 13c by a predetermined value (e.g., by a value of n if the LPF 12 outputs an average value or by a value of m times n if the LPF 12 outputs a sum of m pixels) to produce a vertical moving average value in the extracting range.

The fixed value storing section 15 stores fixed values of clamp level that are set by the user for a black level correction of image signals.

In accordance with a user input from a camera manipulation member (not shown), the second selector section 16 outputs a clamp level value based on either one of a vertical moving average value from the dividing section 14 and a fixed value of clamp level from the fixed value storing section 15.

The clamp level value delivered from the second selector section 16 is converted into an analog signal at the D/A conversion section 6 for output to the clamp section 2. The clamp level value delivered from the second selector section 16 is also supplied to the first selector section 7 via an input delay section (not shown).

The first selector section 7 switches among the image signal and the black level standard signal delivered from the signal output switching section 4 and the clamp level value signal delivered from the second selector section 16 in accordance with an instruction from the CPU 8 to associate the clamp level value with each horizontal row in the effective pixel area 10 for delivery. The output of the second selector section 16 is connected to a digital signal processing section or memory (both not shown) of the electronic camera.

The CPU 8 controls the operation of each section of the electronic camera such as by instructing the image pickup device 1 about a charge accumulation time, and performs various types of operational processing required such as for focusing control and exposure control. For example, the CPU 8 instructs the image pickup device 1 about a charge accumulation time. The CPU 8 also holds the location information of the effective pixel area 10 and the lightproof area 11 in the image pickup device 1 (i.e., the height and width of the effective pixel area 10 and the lightproof area 11). The CPU 8 controls the output switching timing of the signal output switching section 4, the clamp level calculating section 5, and the first selector section 7 based on clock counts.

Action and Effects of the First Embodiment

The clamp level adjusting apparatus according to the first embodiment is constructed as described above. The action and effects of the apparatus will now be explained below in accordance with the two cases: where the clamp level value is created from the lightproof area and where the fixed value of clamp level is employed as the clamp level value.

[The Case of the Clamp Level Value Being Created from the Lightproof Area]

In this case, the user sets the input from the dividing section 14 to the output from the second selector section 16.

First, a user's shutter release causes the CPU 8 to control the image pickup device 1 for performing a photoelectric conversion of a subject image. Output signals from the light-receiving elements in the image pickup device 1 are sequentially read row by row from the topmost row.

The output signals read from the image pickup device 1 are supplied to the signal output switching section 4 via the clamp section 2 and the A/D conversion section 3 in the order in which they were read out. Following an instruction from the CPU 8, the signal output switching section 4 delivers to the first selector section 7 the outputs from the pixels located in a range from the left screen end of the image pickup device 1 to the right end of the effective pixel area 10. The signal output switching section 4 then delivers, to the clamp level calculating section 5 and the first selector section 7, the outputs from the pixels located in a range from the right on the right end in the effective pixel area 10 to the right end of the screen (i.e., m pixels of outputs). In other words, the clamp level calculating section 5 receives only black level standard signals from the lightproof area 11 which is located on the right of the effective pixel area 10.

The LPF 12 of the clamp level calculating section 5 calculates an average value of the m pixels of black level standard signals for delivery to the adding section 13a and the register section 13b of the integrating section 13. The adding section 13a adds n rows of average values delivered by the LPF 12 to output the sum of the extracting range (m times n pixels) to the subtracting section 13c. On the other hand, the register section 13b outputs initial values of zero until it receives more than the n rows of values. Accordingly, the subtracting section 13c outputs all the sums of the extracting range, as they are, to the adding section 13a and the dividing section 14 as integrated values.

On the other hand, when the integrating section 13 receives an average value from LPF 12 that corresponds to the (n+1)th row, the adding section 13a adds the immediately preceding integrated value to the average value of the (n+1)th row for delivery to the subtracting section 13c. Upon reception of the average value of the (n+1)th row, the register section 13b outputs the average value of the first row (the output value of the top row in the immediately preceding extracting range) to the subtracting section 13c. The subtracting section 13c subtracts the average value of the first row from the output value of the adding section (the sum over a range of m times (n+1)) to output, to the adding section 13a and the dividing section 14, an integrated value of an extracting range that is shifted downwardly by one row. Subsequently, the same operation is repeated in this manner for the integrating section 13 to sequentially output the vertical moving sum values of the extracting ranges as integrated values.

The dividing section 14 divides the integrated values from the integrating section 13 by the number of rows in the extracting range (i.e., by a value of n) to sequentially output the resulting vertical moving average values of the extracting range serving as a clamp level value. The clamp level value is supplied to the clamp section 2 via the D/A conversion section 6 on one hand and also supplied to the first selector section 7 via an input delay section (not shown) on the other hand. Then, the clamp section 2 starts making a black level correction with the output signals of the (n+1)th row in the image pickup device 1 in accordance with the clamp level value.

Here, as shown in FIG. 5, suppose that the (n+1)th row is the uppermost row of the effective pixel area 10. In this case, a black level correction is made to the image signals and the black level standard signals of the (n+1)th row using an average value of m times n pixels including the immediately preceding nth row. It is thus possible in the first embodiment to make a highly accurate black level correction with adverse effects of defective pixels in the lightproof area or the like being significantly reduced.

Of the output signals of the (n+1)th row having been subjected to the black level correction, the black level standard signal of the lightproof area 11 corresponding to an extracting range is supplied to the signal output switching section 4 to produce a clamp level value for the (n+2)th row. That is, the black level correction to the immediately preceding row is always reflected upon the clamp level value. Accordingly, the first embodiment allows a gradual black level correction to be made across the effective pixel area 10 without a sudden change in clamp level value between the adjacent upper and lower rows.

Furthermore, the output signals of the (n+1)th row having been subjected to a black level correction are supplied to the first selector section 7. The first selector section 7 switches among outputs following an instruction from the CPU 8 as follows.

That is, for the range from the left screen end of the (n+1)th row to the right end of the effective pixel area 10, the first selector section 7 outputs signals from the signal output switching section 4.

Figure 6:
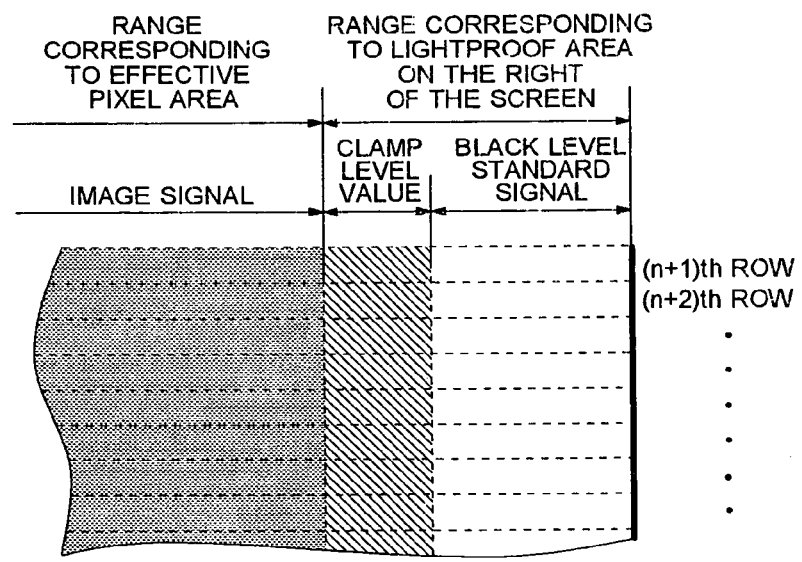
FIG. 6 is a view showing a clamp level value delivered by a first selector section.

On the other hand, the first selector section 7 switches the output to the clamp level calculating section 5 at the right end of the lightproof area 11 on the right of the screen to output a clamp level value corresponding to the (n+1)th row. This allows for outputting, to the predetermined location of the lightproof area 11, the clamp level value that has been used for the black level correction made to the corresponding row (see FIG. 6).

Subsequently, upon complete delivery of the clamp level value, the first selector section 7 switches the output back to the signal output switching section 4 to output signals in a range of up to the right screen end of the (n+1)th row excluding the range of signals whose clamp level values have been recorded. Thereafter, the same operation is repeated in the same manner for each row, thereby allowing for outputting the clamp level values used for black level corrections and associated with each row of the effective pixel area 10.

Accordingly, the first embodiment allows the user to know the allowable black level correction range of image data based on the clamp level value data for each row of the effective pixel area 10. Thus, the first embodiment facilitates the subtle adjustment of brightness by allowing the user to utilize the aforementioned clamp level value data when processing the image data on a computer. This is effective particularly when the raw data (delivered by the clamp level adjusting apparatus) according to the first embodiment is processed by software on a computer.

In response to user's settings or the like, the CPU 8 samples the clamp level value produced based on the black level standard signal and then stores the resulting clamp level value in the fixed value storing section 15 as the fixed value of clamp level. In this case, for example, in response to a change in the photographic optical assembly or the like, the user is allowed to select, as appropriate, a fixed value of clamp level suitable for the shooting situation from the fixed value storing section 15 for taking a picture.

Of course, it is possible for the user to further process the clamp level value created based on the black level standard signal to thereby produce a fixed value of clamp level. For example, suppose that the sampled clamp level value is 200 LSB. In this case, settings are made by processing the fixed value of clamp level into 100 LSB when the user desires a brighter image or by processing the fixed value of clamp level into 300 LSB when the user desires a darker image. In this case, the fixed value of clamp level is customized with respect to the sampled clamp level value. This allows for relatively easily realizing a setting of the black level correction that is imaged by the user.

[The Case of the Fixed Value of Clamp Level Being Employed as the Clamp Level Value]

In this case, the user sets the input from the fixed value storing section 15 to the output from the second selector section 16. In this case, the destination of the output from the signal output switching section 4 is fixed to the first selector section 7. As a clamp level value, the clamp level calculating section 5 outputs a fixed value of clamp level stored in the fixed value storing section 15. Based on the fixed value of clamp level, the clamp section 2 makes a black level correction to the output signal from the image pickup device 1.

On the other hand, the first selector section 7 outputs signals from the signal output switching section 4 within the range from the left screen end to the right end of the effective pixel area 10. Meanwhile, the first selector section 7 switches the output to the clamp level calculating section 5 at the right end of the lightproof area 11 on the right of the screen to output the fixed value of clamp level corresponding to the relevant row. Thereafter, upon completion of output of the fixed values of clamp level, the first selector section 7 switches the output back to the signal output switching section 4 to deliver signals in the range up to the right screen end of the corresponding row excluding the range of signals whose fixed values of clamp level have been recorded. Thereafter, the same operation is repeated for each row in this manner, thereby allowing the clamp level values (fixed values of clamp level) used for black level corrections to be outputted corresponding to each row of the effective pixel area 10. Thus, the same effects as described above can also be obtained.

Explanation of Second Embodiment

Figure 7:
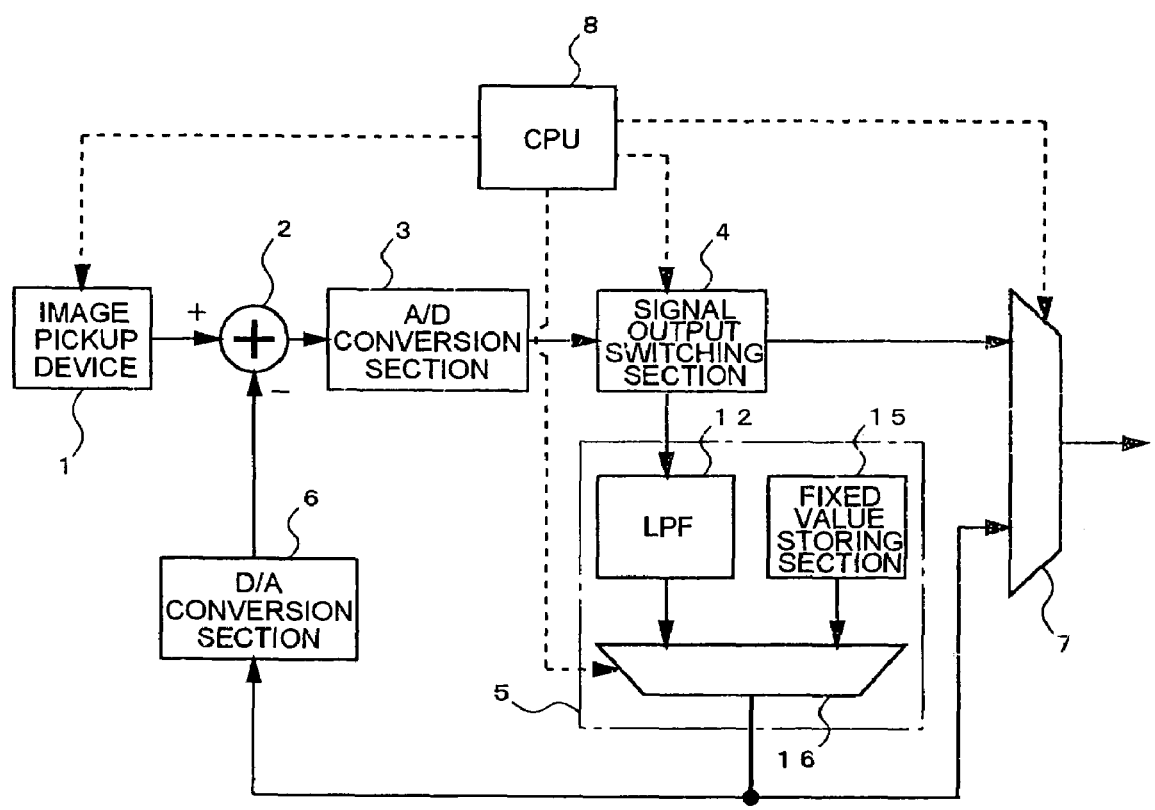
FIG. 7 is a block diagram showing a clamp level adjusting apparatus according to a second embodiment.

FIG. 7 is a block diagram showing a clamp level adjusting apparatus according to a second embodiment. The clamp level adjusting apparatus of the second embodiment is an example for making a black level correction based on an average value of a row in the lightproof area 11. That is, the second embodiment produces a clamp level value for each row in the effective pixel area 10 based on an average value of a row (of m pixels) in the lightproof area 11 delivered from the LPF 12. The other configuration and operation of the second embodiment are the same as those of the first embodiment, and thus will not be detailed repeatedly.

The second embodiment also allows the clamp level values that have been used for black level corrections to be outputted corresponding to each row of the effective pixel area 10. This makes it possible to process images using information on the clamp level value for each row of the effective pixel area 10.

Third Embodiment

Figure 8:
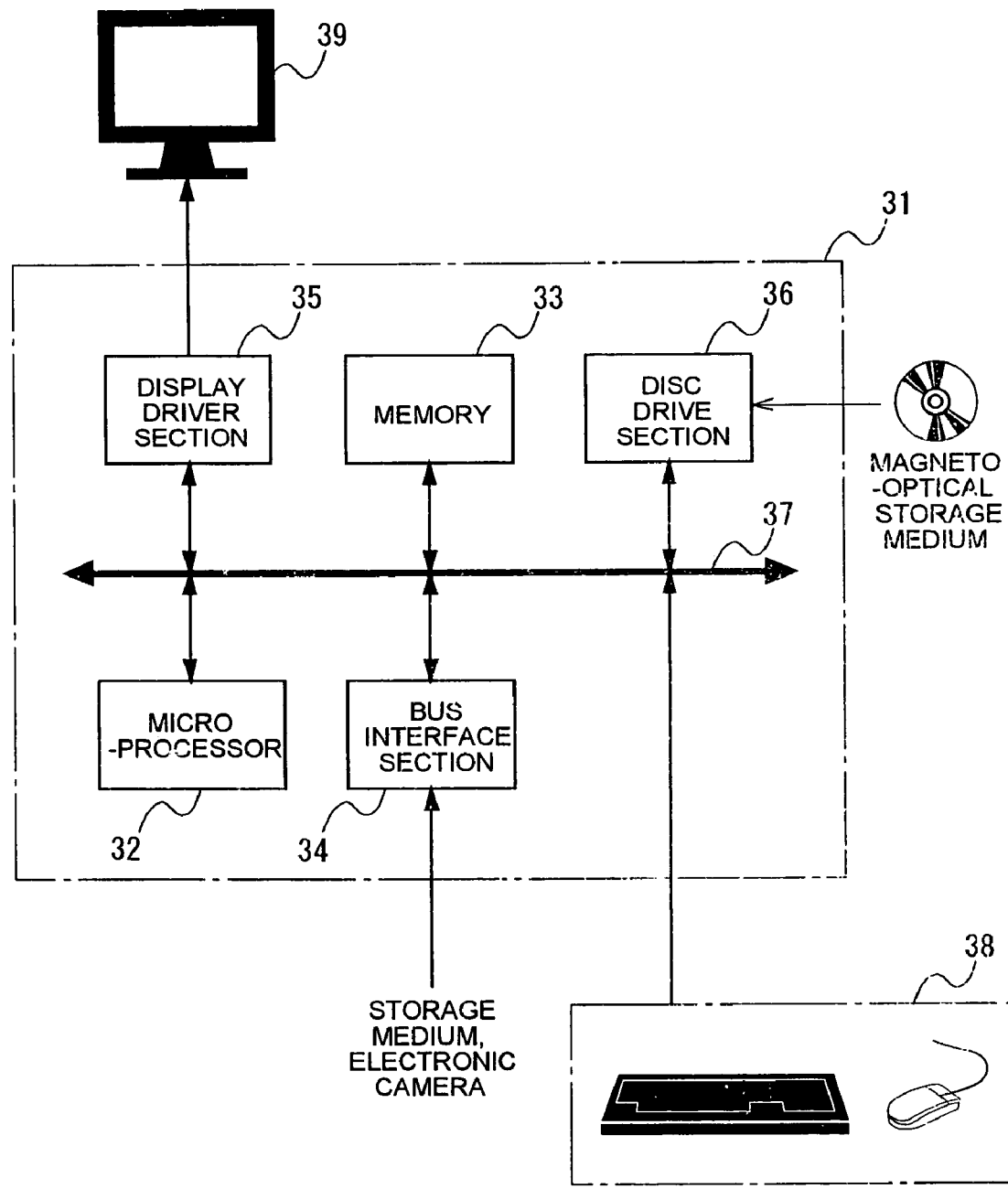
FIG. 8 is a functional block diagram showing an image processing apparatus according to a third embodiment.

FIG. 8 is a functional block diagram showing an image processing apparatus according to a third embodiment. This embodiment is an example for organizing an image processing apparatus by allowing a personal computer or the like to execute an image processing program.

Figure 9:
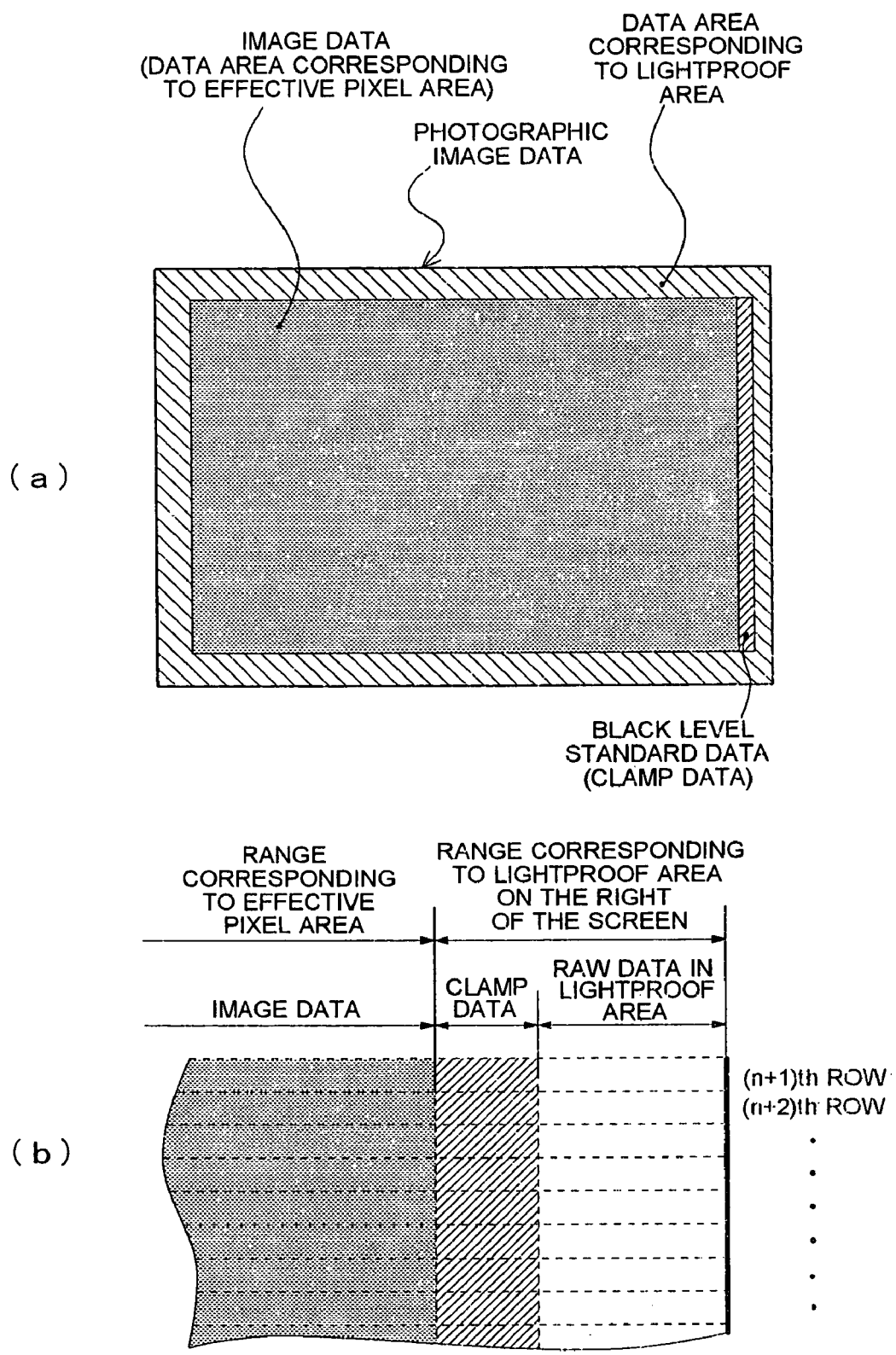
FIG. 9 is a schematic explanatory view showing photographic image data.

First, reference is made to FIG. 9 to explain the outline of photographic image data to be dealt with in this embodiment. The photographic image data is produced by an electronic camera, and includes image data and black level standard data. The image data is created based on an output from the effective pixel area of an image pickup device in the electronic camera, and indicative of a subject image formed by a photographic optical assembly of the electronic camera. On the other hand, the black level standard data is created in accordance with an output from a lightproof area (optically black area) which is formed adjacent to the outer periphery of the effective pixel area and the surface of which is covered with a shield film.

Outputs from the lightproof area in the image pickup device can be considered to be data corresponding to a portion upon which no subject light is incident, i.e., the black color of the subject image. Accordingly, the electronic camera employs the output from the lightproof area to make black level corrections to image data.

In the example of FIG. 9, the clamp data that has been used by the electronic camera for black level corrections of each horizontal row is recorded in a portion of the lightproof area located on the right of the image data (see FIG. 9(b)). At the end of each row of image data, the respective clamp data that has been used for the correction of the corresponding row is recorded. In this embodiment, the aforementioned clamp data is indicative of the horizontal black level standard data. Some electronic cameras may make corrections to all the rows with the same black level value or to a combination of a plurality of rows with the same black level value. In these cases, clamp data is to be recorded corresponding to a data unit for processing.

Now, an explanation is given to the configuration of an image processing apparatus 31 according to this embodiment. The image processing apparatus 31 includes a microprocessor 32, a memory 33, a bus interface section 34, a display driver section 35, a disc drive section 36, and a system bus 37 for connecting between each section. The image processing apparatus 31 is also connected with input section 38 such as a keyboard or pointing device, and a monitor 39.

The microprocessor 32 controls each section of the image processing apparatus 31 and executes and image processing program, discussed later, to correct the black level of photographic image data. The memory 33 stores in a tabulated form the relation between the shooting conditions (e.g., characteristics of the image pickup device depending on the type of the camera, shooting time, and exposure correction) and the offset values for black level standard data which vary depending on the combination of the shooting conditions. The offset value for black level standard data may be determined in advance statistically or customized by the user.

The bus interface section 34 provides control to data communications with peripheral devices connected to the image processing apparatus 31 in conformity with serial transmission standards such as USB (Universal Serial Bus) or IEEE1394 standard. The display driver section 35 outputs images to the monitor 39. The disc drive section 36 reads and writes data on magneto-optical storage media.

Figure 10:
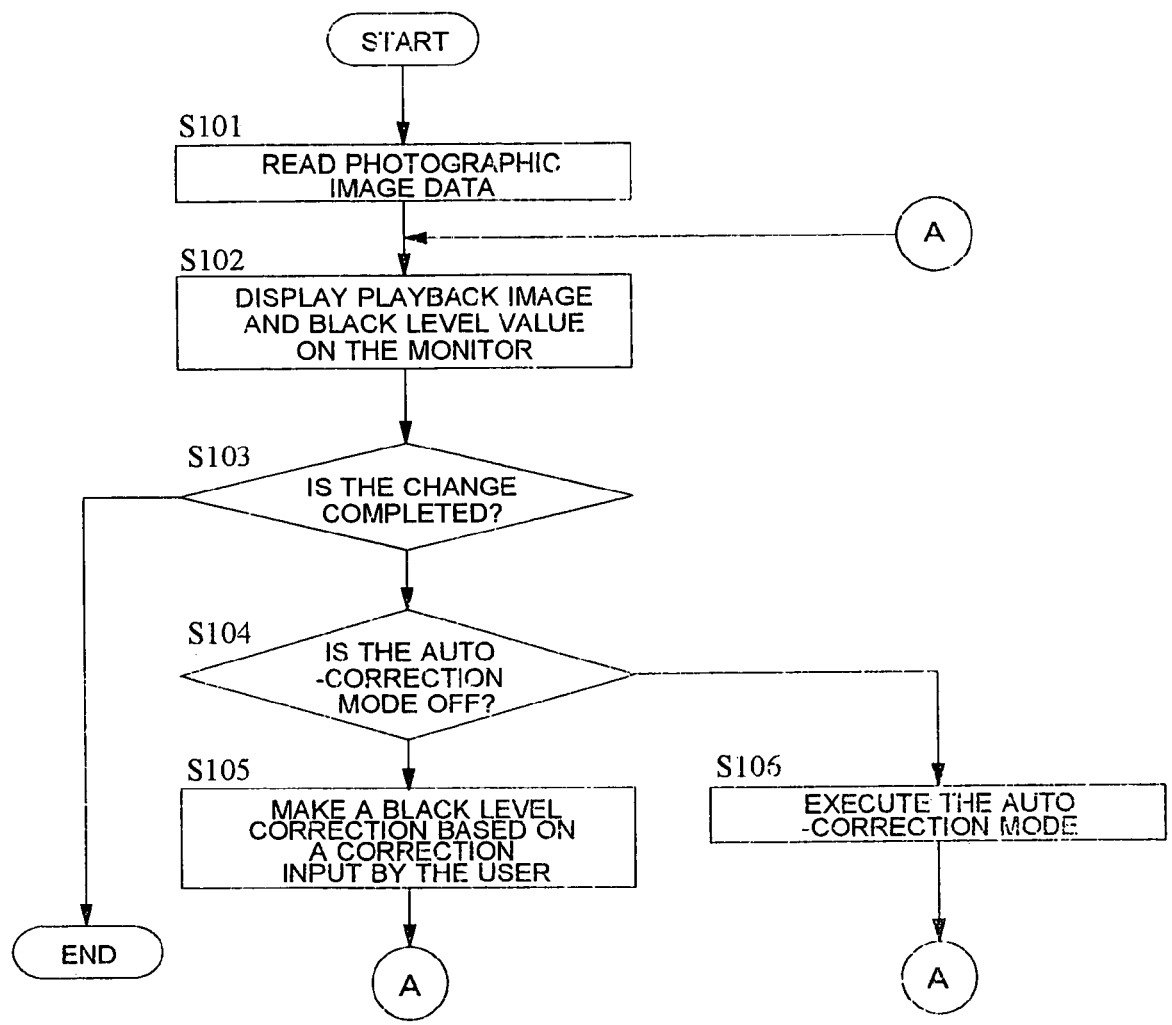
FIG. 10 is a flowchart showing a procedure of an image processing program according to the third embodiment.

The image processing apparatus 31 according to third embodiment is configured in this manner. Now, reference is made to the flowchart shown in FIG. 10 to describe the procedure of the image processing program according to this embodiment.

Step S101: The microprocessor 32 reads photographic image data on a storage medium connected to the bus interface section 34 (or the electronic camera itself connected to the bus interface section 34) or a magneto-optical storage medium inserted into the disc drive section 36.

Figure 11:
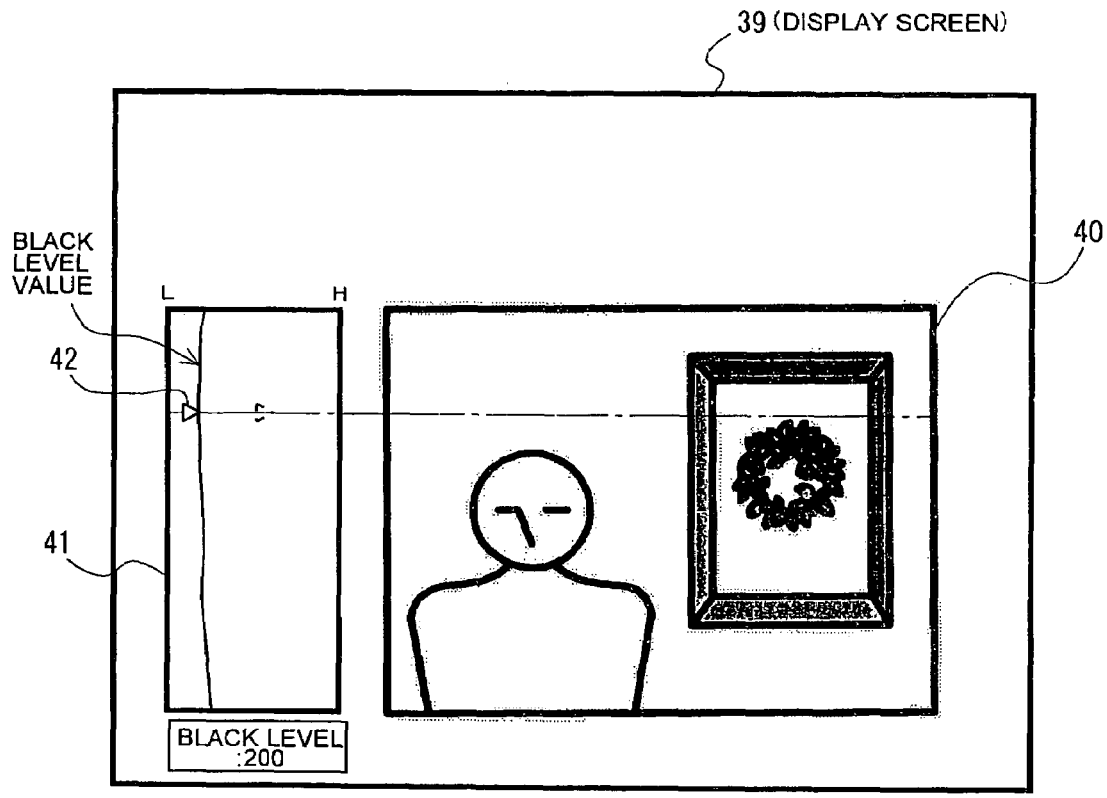
FIG. 11 is a view showing an exemplary display window for the image processing program according to the third embodiment.

Step S102: The microprocessor 32 outputs the image data and black level standard data for display on the monitor 39. As shown in FIG. 11, a playback image 40 of the image data is displayed at the center of the monitor 39. On the left of the playback image 40 on the monitor 39, there appears a display area 41 for displaying the current value of a black level value based on the black level standard data. The display area 41 indicates a black level value corresponding to each horizontal row of image data.

The display area 41 on the monitor 39 indicates the upper limit "H" and lower limit "L" (an alterable range) of the black level value and the current black level value for each row. As shown in FIG. 11, the display area 41 displays a graph of changes in black level value in the vertical direction of the screen. The display area 41 also indicates a pointer 42 for specifying a desired row. An input from the input section 38 allows the pointer 42 to move within each display area (in FIG. 11, a specified row is indicated virtually by an alternate long and short dashed line). In the vicinity of the display area on the monitor 39, there is also an indication of the numerical value of the black level value corresponding to the row specified by the pointer 42.

Accordingly, the black level value based on the image data of the photographic image data (playback image) and the clamp data can be checked by the user on the playback image 40 and the display area 41 on the monitor 39. The user thus can clearly understand the alterable range of the black level value of the image data and changes in black level value in the vertical direction of the screen, thereby determining whether or not a correction has to be made.

Step S103: The microprocessor 32 determines whether the user terminates the alteration of the playback image data displayed (e.g., whether the user has instructed to read other photographic image data or to terminate the image processing program). If the user terminates the alteration (YES), the microprocessor 32 terminates the processing on the current photographic image data. At this time, the photographic image data may be saved on any storage media. On the other hand, if the user does not terminate the alteration (NO), the microprocessor 32 moves on to Step S104.

Step S104: The microprocessor 32 determines whether an auto-correction mode is OFF. If the auto-correction mode is OFF (YES), the microprocessor 32 moves on to Step S105. On the other hand, if the auto-correction mode is ON (NO), the microprocessor 32 moves on to Step S106.

Step S105: In this case, the microprocessor 32 makes a black level correction to image data based upon an input by the user. The user manipulates the pointer 42 on the display area 41 using the input section 38 to specify the row to be changed in black level value. Then, the user may slide the pointer 42 sideward at the specified row or directly input the numerical value of the black level value, thereby changing the black level value of the specified row.

For example, suppose that the image data has a representation range of 12 bits (0 to 4095 LSB: the larger the numerical value, the lighter in color). In this case, for a black level value of the specified row being 200 LSB, the playback image is represented in 200 to 4095 LSB levels of halftone. The black level value is increased when th user desires a brighter image, whereas the black level value is decreased when the user desires a darker image. Then, the microprocessor 32 corrects the black level of the image data again in accordance with the difference between the black level values before and after the change is made, so that the black level standard data of image data at the specified row is updated with the changed black level value data.

Figure 12:
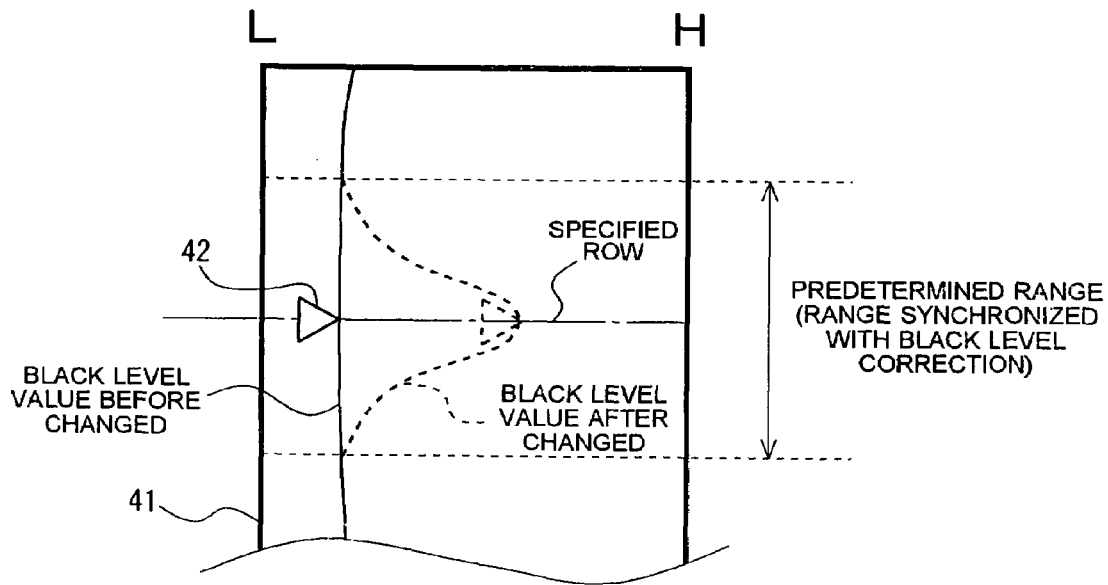
FIG. 12 is an explanatory view showing how black level standard data is interpolated from a specified row to a predetermined range.

Here, a correction made only to the black level of the row specified in the aforementioned correction may cause only the specified row thus corrected to be isolated from the surrounding in the playback image. To prevent this situation, the microprocessor 32 may make black level corrections, operatively associated with the black level correction of the specified row, also to upper and lower rows adjacent to the specified row within a predetermined range (see FIG. 12).

For example, within a predetermined range of rows from the specified row, the microprocessor 32 may allow the value of the amount of change in black level value of the specified row multiplied by an interpolation factor to be added to the current black level value for correction. This allows the changes in black level value within from the specified row to a predetermined range to be smoothed. The aforementioned interpolation factor is greater than zero and less than one and so set as to decrease with distance from the specified row. It is particularly preferable that the interpolation factor be set so as to allow the black level values within from the specified row to a predetermined range to vary in a curve. It is possible to apply a well-known interpolation method, such as the spline method, to the calculation of the interpolation factor.

After a black level correction is made in Step S105, the microprocessor 32 then moves on to Step S102 to display the playback image having its black level re-corrected and the updated black level value on the monitor 39. This allows the user to determine whether the black level correction has been made properly.

Step S106: In this case, a user setting causes the microprocessor 32 to selectively perform the processing of corrections (1) to (3) below.

(1) Correction of Blackout Phenomenon

Figure 13:
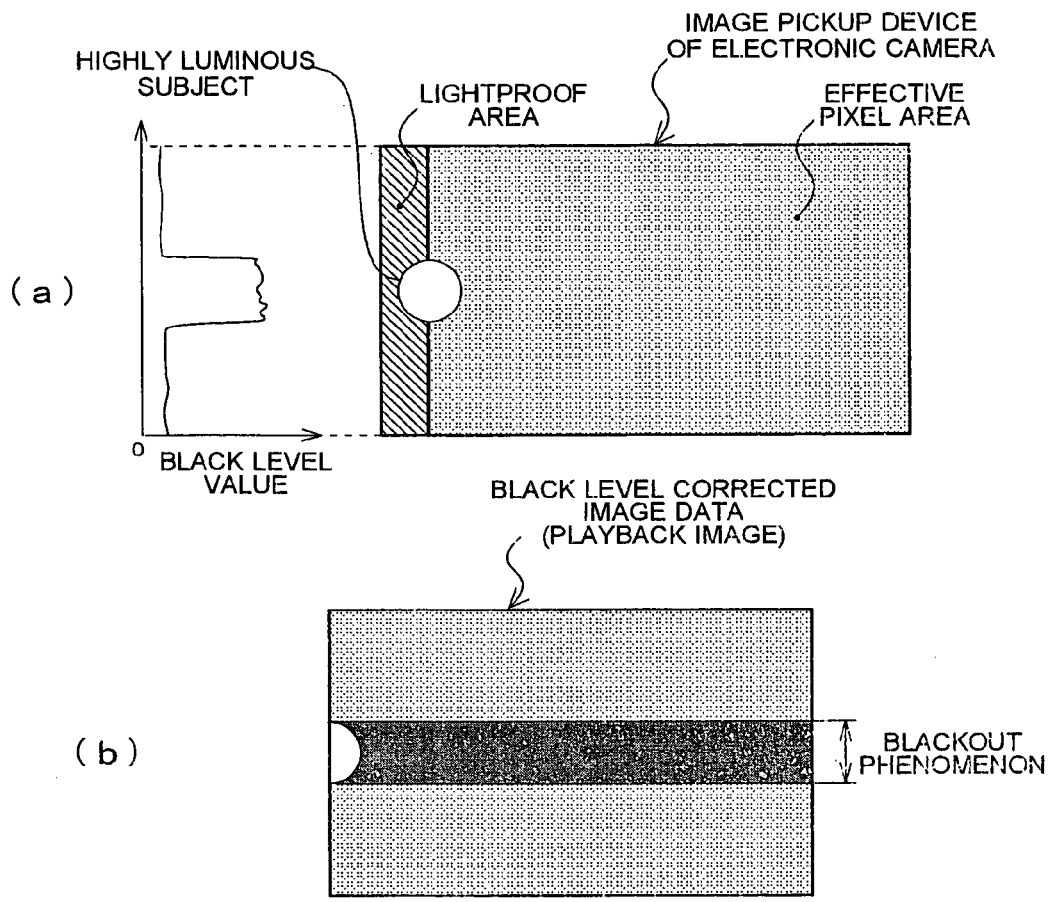
FIG. 13 is an explanatory view showing a blackout phenomenon.
Figure 14:
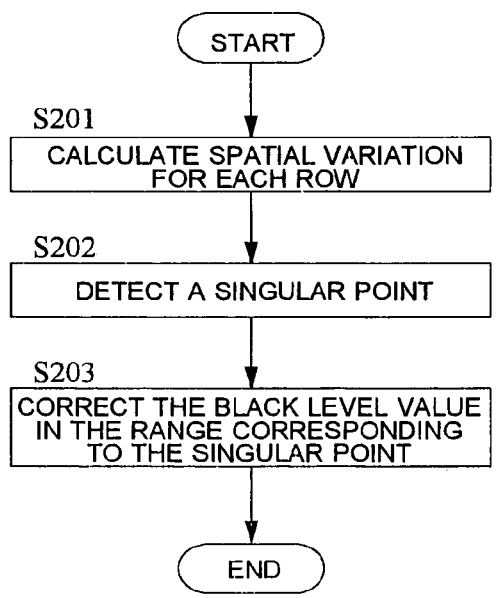
FIG. 14 is a flowchart showing a procedure for compensating for the blackout phenomenon.

As used herein, the term "blackout phenomenon" refers to a phenomenon that a black level corrected image appears to sink in dark streaks relative to its surrounding (see FIG. 13). This phenomenon occurs due to a fact that a highly luminous subject located near the lightproof area used for a black level correction causes stray light to come into the lightproof area located near the highly luminous subject and thereby raise the signal level. In this correction mode, the microprocessor 32 performs the following processing as shown in FIG. 14.

First, the microprocessor 32 calculates the difference (spatial variation) of black level standard data between each row and each of the adjacent upper and lower rows (S201). Then, the microprocessor 32 detects a singular point at which the calculated spatial variation is greater than or equal to a threshold value (S202). The row including this singular point corresponds to the starting point (or ending point) of the blackout phenomenon. The microprocessor 32 then corrects the black level value of the range corresponding to the singular point (i.e., the row in which the blackout phenomenon has occurred) in accordance with the spatial variation in the singular point row, thereby correcting the black level of the image data (S203). The aforementioned operation allows for alleviating the blackout phenomenon of photographic images using the black level standard data also in the post-processing step followed by the image processing apparatus, thereby providing better photographic images.

(2) Shading Correction

Figure 15:
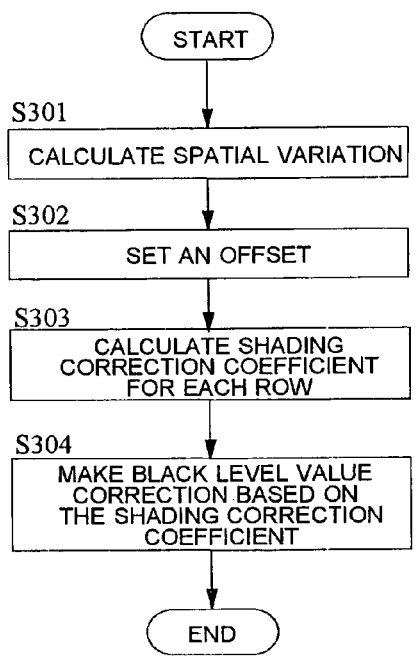
FIG. 15 is a flowchart showing a procedure for a shading correction.

This correction is intended to correct for local strain (shading) occurring in amplitude of output from the image pickup device of an electronic camera due to effects such as variations in sensitivity of sensors. In this correction mode, the microprocessor 32 performs the following processing as shown in FIG. 15.

First, the microprocessor 32 samples black level values at certain intervals in the vertical direction to calculate the difference (spatial variation) between their pieces of black level standard data (S301). Then, the microprocessor 32 sets the black level value at a given sampling point to an offset (S302). The microprocessor 32 adds a value based on the spatial variation of each row to the offset from S302 to thereby calculate the shading correction coefficient for each row (S303). Then, the microprocessor 32 subtracts the shading correction coefficient from the black level value for each row to thereby correct the black level of the image data (S304). The aforementioned operation allows for making the shading correction in the vertical direction on the screen using the black level standard data also in the post-processing step followed by the image processing apparatus, thereby providing better photographic images.

(3) Correction with Offset Value Based on Shooting Conditions

In this correction mode, the microprocessor 32 reads the offset value of the black level standard data from the memory 33 in accordance with the settings of the shooting conditions pre-specified by the user (such as the type of the camera, shooting time, and exposure correction). The microprocessor 32 then corrects the black level of the image data based on the offset value. The aforementioned operation allows for making black level corrections in a simple manner, which are different from each other depending on the shooting condition, also in the post-processing step followed by the image processing apparatus, thereby readily providing photographic images intended by the user.

After the black level correction is made in Step S106, the microprocessor 32 then moves on to Step S102 to display the playback image having its black level re-corrected and the updated black level value on the monitor 39. This allows the user to determine whether the black level correction has been made properly. If a further correction is required, a manual correction can be made in S105 to realize photographic images intended by the user.

Explanation of Fourth Embodiment

Figure 16:
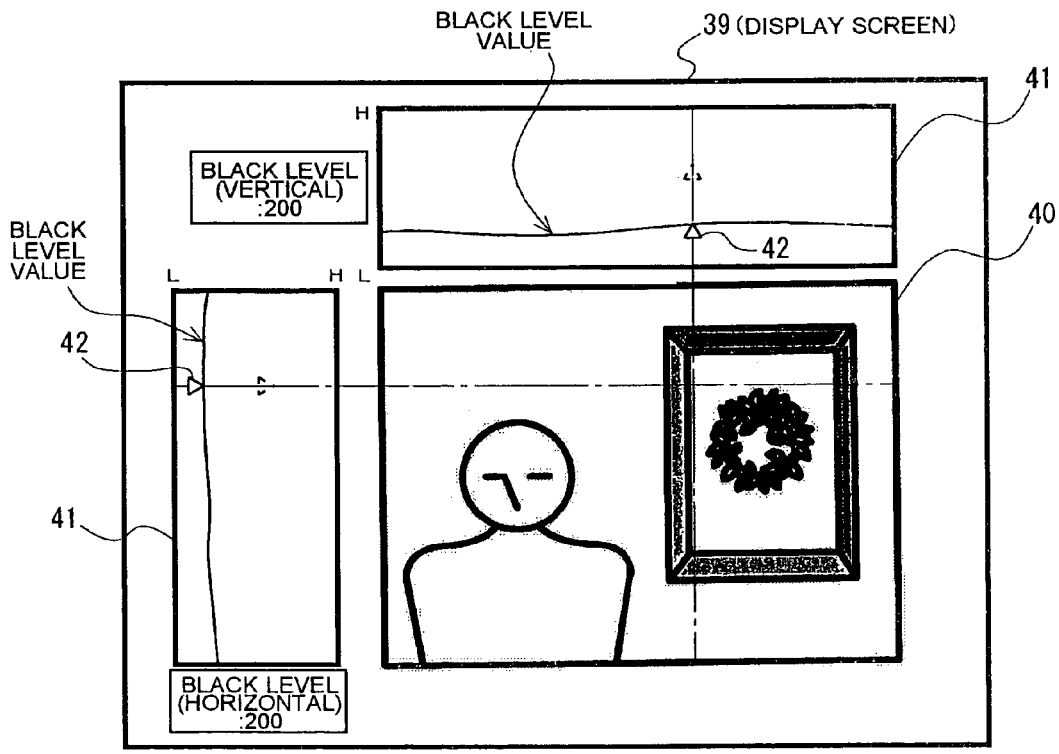
FIG. 16 is a view showing an exemplary display window for an image processing program according to a fourth embodiment.

FIG. 16 is a view showing an example of a display window according to an image processing program according to a fourth embodiment. The fourth embodiment, or a modified example of the third embodiment, is different therefrom in that a black level correction is made to each horizontal row of image data using clamp data, and correction processing is performed on each vertical column using data from the lightproof area. In the drawings, like reference symbols indicate the same components as those of the third embodiment and will not be explained repeatedly.

The microprocessor 32 according to the fourth embodiment creates black level standard data corresponding to each vertical column from raw data in the lightproof area located above or below the effective pixel area. On the upper portion of the monitor 39 above a playback image 40 shown in FIG. 16, there is provided a display area 41 in which the black level value appears for each vertical column of image data.

The fourth embodiment allows the user also to manipulate the pointer 42 in the display area 41 for each vertical column and thereby change the black level value of a given column, thus re-correcting the black level of image data. The black level value corresponding to the vertical direction of image data is overwritten and thereby stored in a given format on an unused portion of the data area corresponding to the lightproof area.

Figure 17:
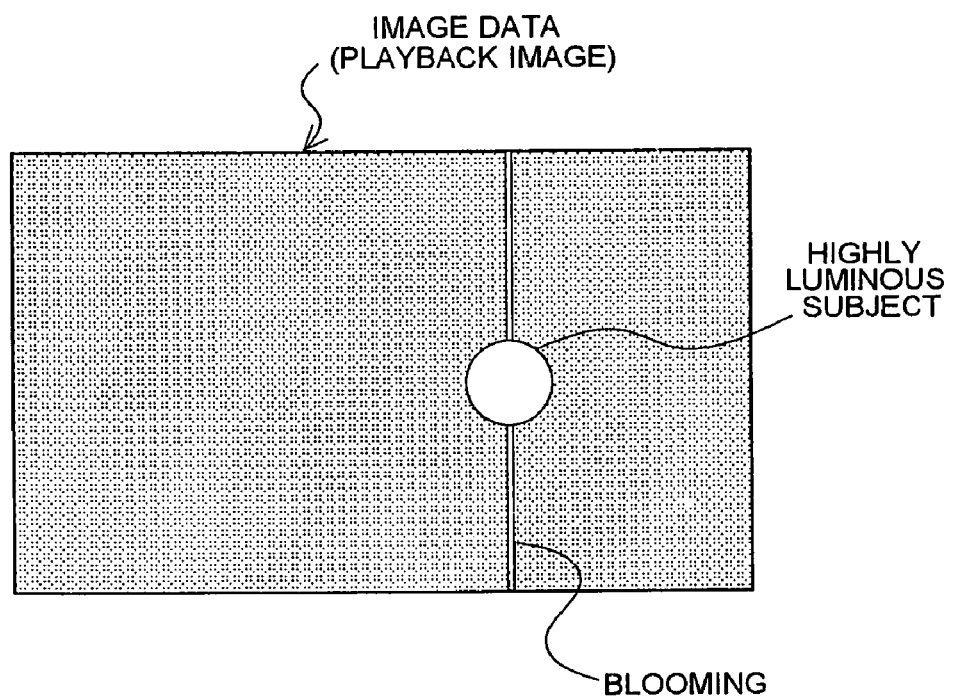
FIG. 17 is an explanatory view showing a blooming phenomenon.

Furthermore, the fourth embodiment enables changes in vertical black level value of image data, thereby making it possible to make a blooming correction across the upper and lower ends of the screen in addition to the shading correction across the right and left ends of the screen. As used herein, the term "blooming" refers to a phenomenon that a highly luminous subject being captured with a CCD causes electrons to occur exceeding the saturation capacity of pixels, resulting in the electrons overflowing into adjacent pixels along a read line of the CCD (see FIG. 17).

The microprocessor 32 can also correct for the blooming by following almost the same steps as for the aforementioned blackout phenomenon. That is, the microprocessor 32 calculates the difference (spatial variation) of black level standard data between each column and each of the adjacent right and left columns. Then, the microprocessor 32 detects a singular point at which the calculated spatial variation is greater than or equal to a threshold value. The column including this singular point corresponds to the starting point (or ending point) of the blooming. The microprocessor 32 then changes the black level value within the range corresponding to the singular point (i.e., the column in which the blooming has occurred) in accordance with the spatial variation, thereby correcting the black level of the image data.

Figure 18:
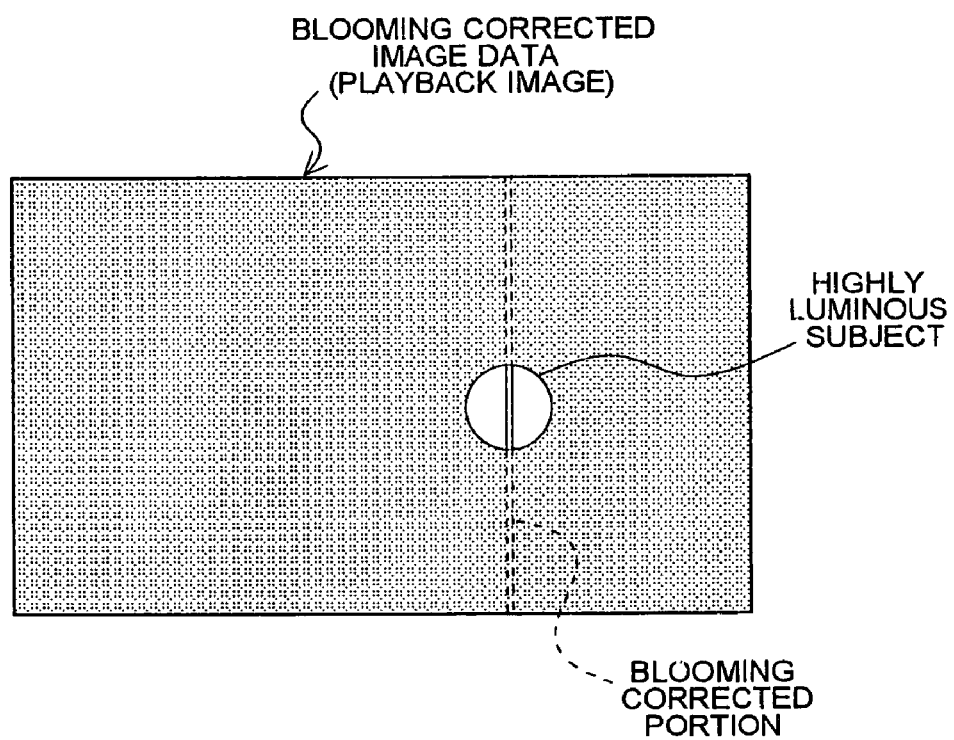
FIG. 18 is an explanatory view showing a blooming phenomenon compensated for by applying the spatial variation of a singular point column as it is.

Here, if the blooming correction was made by subtracting the spatial variation of the singular point column from the black level value as it is, the corrected portion would appear to sink in dark streaks at a highly luminous subject, thus providing unreal images (see FIG. 18). For this reason, for the blooming correction, the spatial variation of a singular point column is not employed as it is as a correction value, but a value of the spatial variation multiplied by a given factor (e.g., a value of 50 to 80% of the spatial variation) is preferably employed as a correction value. The aforementioned operation allows for alleviating the blooming across the upper and lower ends of the screen in the post-processing step followed by the image processing apparatus, thereby providing better photographic images.

Supplementary Items of the Embodiments

The invention is not limited to the above embodiments and various modifications may be made without departing from the spirit and scope of the invention. Any improvement may be made in part or all of the components.

(1) For example, in the first and second embodiments, a clamp level value is produced from the lightproof area on the right of the screen. However, an extracting range may also be set on the lightproof area on the left of the screen to provide a vertical moving average value of the extracting range as a clamp level value. In this case, it is also possible to include a lightproof area in the same row as that of the effective pixel area to be corrected in the extracting range to produce the clamp level value.

(2) Furthermore, in the first and second embodiments, a clamp level value is outputted by being associated for each row with the right end of the lightproof area 11 located on the right of the screen. However, the invention is not limited to this method of outputting the clamp level value. For example, a memory (not shown) for temporarily storing clamp level values for each row may be provided in the clamp level calculating section 5 or the like in order to write the relation between each row of the effective pixel area and the clamp level value onto a portion of the lightproof area below the effective pixel area or onto a given tag area of final image data. The setting of the extracting range in FIG. 5 is illustrated only by way of example. It is naturally possible to change the number m of horizontal pixels and the number n of rows in the extracting range as appropriate.

(3) In the first and second embodiments, an example of the image pickup device 1 was shown which employs the X-Y addressing scheme (such as CMOS or LBCAST).

However, it is also possible to use the image pickup device 1 which employs the sequential charge transfer scheme (such as CCDs).

(4) To make corrections to the blackout, shading, and blooming phenomena in the third embodiment, it is also possible to employ the manual correction made by the user (S105).

In the third and fourth embodiments, such an example was also explained which implements an image processing apparatus on a computer. However, for example, the aforementioned program may also be executed on the electronic camera, so that the blackout phenomenon or blooming of a captured image can be automatically corrected for on the electronic camera. In this case, the black level value is not always required to be externally displayed.

For convenience of understanding, the effects of the aforementioned embodiments will be described below supplementally in a generalized representation.

The aforementioned clamp level adjusting apparatus shifts vertically an extracting range of multiple horizontal rows in a lightproof area to produce a clamp level value corresponding to each horizontal row of an effective pixel area based on moving averages of the extracting ranges. Accordingly, even in the presence of a defective pixel in a particular horizontal row of the lightproof area, it is possible to make a highly accurate black level correction with adverse effects of the defective pixel or the like being significantly reduced.

Furthermore, the aforementioned clamp level adjusting apparatus allows a clamp level value having been used for the black level correction of an image signal to be outputted corresponding to each horizontal row of the effective pixel area. Accordingly, the user can adjust the brightness of images based on the clamp level value data for each horizontal row of images, thereby easily performing enhanced subtle image processing.

The aforementioned image processing apparatus or image processing program is adapted to associate the black level standard data on the black level correction made by the electronic camera with the image data for display. The user thus can adjust the brightness of the screen in accordance with the information on the black level correction made by the electronic camera. Accordingly, the user can easily make an enhanced subtle black level correction in the reactive image processing using a computer or the like. This is effective particularly when the raw data (delivered by the image pickup device) of the electronic camera is processed by software on the computer.

What is claimed is:

1. A clamp level adjusting apparatus comprising:
an image pickup device that includes an effective pixel area producing an image signal and a lightproof area formed around said effective pixel area to produce a black level standard signal;
an integrating section that adds said black level standard signal of a plurality of horizontal rows in said lightproof area until a number of rows to be integrated reaches the number of rows of an extracting range to output an integrated value, and when said black level standard signal is supplied exceeding the number of rows of said extracting range, said integrating section sequentially updates said integrated value for output by subtracting the output value of the top row in said extracting range therefrom;
a dividing section that divides said integrated value by a predetermined value to produce a vertical moving average value of black level standard signals in said extracting range;
a clamp level calculating section that produces a clamp level value corresponding to each horizontal row in said effective pixel area based on the vertical moving average value; and
a clamp section that corrects a black level of said image signal in accordance with said clamp level value.

2. The clamp level adjusting apparatus according to claim 1, wherein said clamp level calculating section comprises:
a low-pass filter that reduces a high-frequency component of said black level standard signal for each horizontal row in said lightproof area, wherein
said integrating section that adds an output value from said low-pass filter up to the number of rows of said extracting range to output an integrated value of said extracting range, and when the output value from said low-pass filter is supplied exceeding the number of rows of said extracting range, said integrating section sequentially updates said integrated value for output by subtracting the output value of the top row in said extracting range therefrom.

3. The clamp level adjusting apparatus according to claim 2, wherein:
said integrating section comprises
an adding section that adds the output value from said low-pass filter at least up to the number of rows in said extracting range for output,
a register section that stores the output value from said low-pass filter up to the number of rows in said extracting range on a first-in first-out basis for sequential output, and a subtracting section that subtracts an output value of said register section from an output value of said adding section to calculate said integrated value and outputs said integrated value to said dividing section; and said integrated value is supplied back to said adding section so that said integrated value sequentially outputted becomes a vertical moving sum of said extracting range.

4. The clamp level adjusting apparatus according to claim 1, wherein said clamp level calculating section produces a clamp level value corresponding to the uppermost horizontal row of said effective pixel area from said extracting range defined in said lightproof area above the uppermost row.

5. The clamp level adjusting apparatus according to claim 1, further comprising:

a fixed value storing section that stores a fixed value of clamp level which has been pre-set to correct the black level of said image signal, and a selecting section that selects, based on a user input, either one of said fixed value of clamp level and said vertical moving average value to output said clamp level value.

6. The clamp level adjusting apparatus according to claim 4, further comprising:

a fixed value storing section that stores a fixed value of clamp level which has been pre-set to correct the black level of said image signal; and a selecting section that selects, based on a user input, either one of said fixed value of clamp level and said vertical moving average value to output said clamp level value.

7. An electronic camera comprising the clamp level adjusting apparatus according to claim 1.

8. An electronic camera comprising the clamp level adjusting apparatus according to claim 4.

* * * * *